United States Patent
Shi et al.

(10) Patent No.: US 9,500,531 B2
(45) Date of Patent: Nov. 22, 2016

(54) WAVEFRONT SENSING APPARATUS, METHOD AND APPLICATIONS

(71) Applicant: UNIVERSITY OF ROCHESTER, Rochester, NY (US)

(72) Inventors: Zhimin Shi, Tampa, FL (US); Robert W. Boyd, Webster, NY (US); (Continued)

(73) Assignee: University of Rochester, Rochester, NY (US)

( * ) Notice: Subject to any disclaimer, the term of this patent is extended or adjusted under 35 U.S.C. 154(b) by 23 days.

(21) Appl. No.: 14/224,353

(22) Filed: Mar. 25, 2014

(65) Prior Publication Data
US 2014/0285813 A1 Sep. 25, 2014

Related U.S. Application Data

(60) Provisional application No. 61/804,860, filed on Mar. 25, 2013.

(51) Int. Cl.
*G01B 9/02* (2006.01)
*G01J 9/02* (2006.01)
*G01J 4/04* (2006.01)

(52) U.S. Cl.
CPC .. *G01J 9/02* (2013.01); *G01J 4/04* (2013.01); *G01J 2009/0261* (2013.01)

(58) Field of Classification Search
CPC .................. G01J 9/02; G01J 2009/0261; G01J 4/04; G01B 2290/55; G01B 2290/70
(Continued)

(56) References Cited

U.S. PATENT DOCUMENTS 5,037,202 A * 8/1991 Batchelder ......... G01N 15/0205
356/335
5,253,183 A * 10/1993 Inoue .................... G01J 3/4537
356/319
(Continued)

FOREIGN PATENT DOCUMENTS

WO WO 0125721 A1 * 4/2001 ......... G01B 11/2441

OTHER PUBLICATIONS

Jeff S. Lundeeni, et. al., Direct Measurement of the Quantum Wavefunction, Dec. 16, 2011, Nature 474, 188-191 (Jun. 9, 2011) doi:10.1038/nature10120, Nature Publishing Group, a division of Macmillan Publishers Limited.
(Continued)

*Primary Examiner* — Tarifur Chowdhury
*Assistant Examiner* — Jonathon Cook
(74) *Attorney, Agent, or Firm* — Andrew J. Anderson, Esq.; Harter Secrest & Emery LLP (57) ABSTRACT

A wavefront sensing technique using Polarization Rotation INTerferometry (PRINT) provides a self-referencing, high-resolution, direct measurement of the spatially dependent phase profile of a given optical beam. A self-referencing technique is used to create a reference beam in the orthogonal polarization and a polarization measurement to measure the spatial-dependent polarization parameters to directly determine the absolute phase profile of the beam under test. A high-resolution direct measurement of the spatially-resolved phase profile of one or more optical beams is realized.

18 Claims, 3 Drawing Sheets

(72) Inventors: Mohammad Mirhosseini, Rochester, NY (US); Mehul Malik, Rochester, NY (US)

(58) Field of Classification Search
USPC .......................................................... 356/491
See application file for complete search history.

(56) References Cited

U.S. PATENT DOCUMENTS

| | | | | |
|---|---|---|---|---|
| 5,841,536 A * | 11/1998 | Dimmick | ............. | G01J 9/0246 356/491 |
| 5,933,236 A * | 8/1999 | Sommargren | ..... | G01B 11/2441 356/513 |
| 7,006,234 B1 * | 2/2006 | Cottrell | .................... | G01J 9/02 356/495 |
| 7,057,737 B2 * | 6/2006 | Millerd | .................... | G01J 9/02 356/495 |
| 7,106,456 B1 * | 9/2006 | Cottrell | .................... | G01J 9/02 356/495 |
| 2008/0043224 A1 * | 2/2008 | Castonguay | ............. | G01J 9/02 356/73 |
| 2009/0310206 A1 * | 12/2009 | Gluckstad | ................ | G06E 3/00 359/238 |

OTHER PUBLICATIONS

Tyo et al.: Review of passive imaging polarimetry for remote sensing applications Aug. 1, 2006 / vol. 45, No. 22 / Applied Optics 5453-5469.

* cited by examiner

WAVEFRONT SENSING APPARATUS, METHOD AND APPLICATIONS

RELATED APPLICATION DATA

The instant application claims priority to U.S. provisional application Ser. No. 61/804,860 filed Mar. 25, 2013, the subject matter of which is incorporated herein by reference in its entirety.

GOVERNMENT SPONSORSHIP

The research that lead to the embodiments as disclosed herein, and the invention as claimed herein, was funded by the United States Defense Advanced Research Project Administration under W911NF-10-1-0395. The United States Government has rights in the invention.

BACKGROUND

Aspects and embodiments of the invention are directed to the field of optical wavefront sensing; more particularly to an optical wavefront sensing apparatus and associated method; and most particularly to a wavefront sensing technique using Polarization Rotation INTerferometry (PRINT), associated apparatus, and applications thereof.

Current approaches for measuring the phase of an optical wavefront include, without limitation, Shack-Hartmann interferometry, point diffraction interferometry, shear interferometry, and phase retrieval. Table 1 below lists some comparative attributes of these approaches and what might be considered ideal.

TABLE 1

|  | Resolution | Phase information | Affected by amplitude information? | Speed |
| --- | --- | --- | --- | --- |
| Shack-Hartmann | Low | Indirect (gradient) | Weakly | Need processing |
| Point Diffraction | High | w/ ambiguity | Yes | Real-time |
| Shear | Low | Indirect (gradient) | Modestly | Need processing |
| Phase Retrieval | High | Direct | Yes | Need heavy processing |
| Ideal | High | Direct | No | Real-time |

As evident from Table 1, none of the listed approaches provides the ideal combination of self-referencing, real-time, direct, high resolution phase measurement unaffected by signal amplitude. Phase shifting interferometry has also proved to be an effective way to measure the phase profile; but most of these methods typically require either a time-sequence of measurements or a separate reference field.

The inventors have thus recognized the advantages and benefits to be provided by methods and apparatus that address and overcome the aforementioned shortcomings and challenges in the art, especially in applications including, but not limited to, astronomical observation, biomedical imaging, and free-space communication, etc.

DEFINITIONS AS USED HEREIN

The term 'about' means the amount of the specified quantity plus/minus a fractional amount (e.g., ±10%, ±9%, ±8%, ±7%, ±6%, ±5%, ±4%, ±3%, ±2%, ±1%, etc.) thereof that a person skilled in the art would recognize as typical and reasonable for that particular quantity or measurement.

The term 'substantially' means as close to or similar to the specified term being modified as a person skilled in the art would recognize as typical and reasonable; for e.g., within typical manufacturing and/or assembly tolerances, as opposed to being intentionally different by design and implementation.

SUMMARY

The most general aspects of the invention are an optical wavefront sensing apparatus and a wavefront sensing method.

An aspect of the invention is a wavefront sensing apparatus that utilizes multiple polarization projection measurements to unambiguously obtain the phase information of an optical beam. As used herein, a polarization projection measurement refers to a measure of the intensity component in a specific polarization state of an optical field having an arbitrary polarization state.

An aspect of the invention is an optical wavefront sensing apparatus that includes an imaging system; a polarization rotator disposed at a Fourier plane, or adjacent the Fourier plane at a known position, of an input field having a polarization state incident on the imaging system; a polarization analyzer disposed between the polarization rotator and an image plane of the system; and one or more spatially-resolving detectors disposed in the image plane of the input field having a constant zoom factor, wherein a polarized signal field and an orthogonally polarized reference field can be generated, further wherein one of the signal field and the reference field has a same polarization as the input field and one of the reference field and the signal field has an orthogonal polarization to that of the input field. According to various exemplary, non-limiting embodiments, the wavefront sensing apparatus may include the following additional features, limitations, and/or characteristics alone or in combination:

wherein the imaging system is a one or a multiple-cascaded imaging system such that the complex optical field at the image plane has a deterministic mapping relation to the complex optical field at the input plane;

wherein the imaging system is a 4-f imaging system;

wherein the polarization rotator is a spatial light modulator;

wherein the polarization rotator is a birefringent material;

wherein the polarization rotator is a plasmonic nano-antenna;

wherein the polarization rotator is a dielectric resonant structure;

wherein the polarization rotator is a metamaterial;

wherein the polarization rotator is a liquid crystal device;

wherein the polarization analyzer comprises at least one polarizing beam splitter;

wherein the polarization analyzer comprises at least three different polarizers configured such that the transmitted field through each different polarizer will have different, but known polarization states;

further comprising an input field-conditioning spatial light modulator disposed optically upstream of an input of the imaging system.

An aspect of the invention is a wavefront sensing method including the steps of imaging an input field characterized by a polarized complex optical field to be measured through an optical imaging system; creating a reference optical field having a known amplitude and phase profile at the image plane and an orthogonal polarization to that of the input field by rotating the polarization of the input field over an area of the optical field at a known intermediate plane of the imaging system, wherein the area is equal to or less than the diffraction-limited spot size of the field produced by the imaging system at the known intermediate plane; transmitting the input field and the generated reference field through a polarization analyzer to interfere the orthogonally polarized input field and reference field; separating the interfered, orthogonally polarized input field and reference field; generating two pairs of images consisting of field components, each pair in two different polarization states [($I_1$, $I_2$), ($I_3$, $I_4$)], wherein $I_1$ and $I_2$ are orthogonally polarized and $I_3$ and $I_4$ are orthogonally polarized, and further wherein any polarization state in any given pair must have equal projection intensity in the two polarization states in any of the two other pairs; determining a respective spatial resolving indicia for each pair of images [($I_1$, $I_2$), ($I_3$, $I_4$)]; and determining an unambiguous phase profile of the input field using the spatial resolving indicia. According to various exemplary, non-limiting embodiments, the wavefront sensing method may include the following additional steps, features, limitations, and/or characteristics alone or in combination:

imaging the input field through one or a multiple-cascaded imaging system such that the complex optical field at the image plane has a deterministic mapping relation to the complex optical field at the input plane;

wherein the one or a multiple-cascaded imaging system is one of a 4-f optical imaging system and a multiple-cascaded 4-f optical imaging system;

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

DETAILED DESCRIPTION OF NON-LIMITING EXEMPLARY EMBODIMENTS

Figure 1:
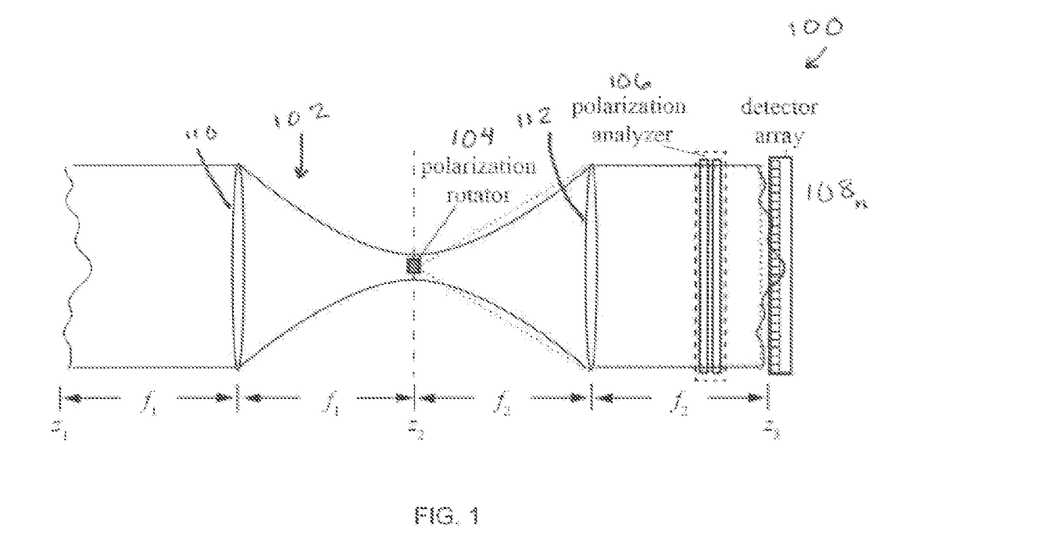
FIG. 1 is a schematic diagram of a polarization rotating interferometry wavefront sensor, according to an exemplary embodiment of the invention.

An embodiment of the invention is a Polarization Rotation INTerferometry (PRINT) wavefront sensor 100 and associated technique. An example is shown in FIG. 1, in which the wavefront sensor 100 includes a 4-f imaging system 102, a polarization rotator 104, a polarization analyzer 106 (including one or more polarizing beam splitters-PBS s), and one or more spatial-resolving detectors $108_n$. The 4-f imaging system maps the complex electromagnetic field on the input plane $z_1$ onto the detection plane $z_3$. The polarization rotator 104 is located in the back focal plane $z_2$ of the first lens 110, and the polarization analyzer 106 is located between the second lens 112 and the spatial resolving detector array $108_n$.

The complex field at the input plane is a linearly polarized light in the x-direction $A_x$ (x, y, z=$z_1$). The field distribution at the back focal plane of lens 1 (z=$z_2$) is the Fourier transform of the input field, which can be expressed as follows $$A_x(u, v, z = z_2) = \int\int A_x(x, y, z = z_1)\exp\left[\frac{i2\pi}{f_1\lambda}(ux + vy)\right]dx dy$$

Without the polarization rotator, the field at the back focal plane of lens 2 (z=$z_3$) is identical to the input complex field except with a zoom factor of $f_2/f_1$:

$$A_x(\xi, \zeta, z = z_3) = A_x\left(\frac{f_1}{f_2}\xi, \frac{f_1}{f_2}\zeta, z = z_1\right)$$

The polarization rotator 104 is a device that can rotate the polarization of the beam by a controllable amount, α (generally 0–π/2), over an area centered at ($u_0$, $v_0$). When α is small, e.g., 0–π/10, for utilizing a small angle approximation and the rotation area is small; i.e., comparable or smaller than the diffraction limited spot size of the system, the transmitted beam through the polarization rotator can be written as the x-polarized component and the y-polarized component as:

$A'_x(u, v, z = z_2) =$ $$\begin{cases} A_x(u, v, z = z_2) & u \neq u_0, v \neq v_0 \\ \cos\alpha A_x(u, v, z = z_2) \approx A_x(u, v, z = z_2) & (u = u_0, v = v_0) \end{cases},$$

$A'_y(u, v, z = z_2) =$ $$\begin{cases} 0 & u \neq u_0, v \neq v_0 \\ \sin\alpha A_x(u, v, z = z_2) \approx \alpha A_x(u, v, z = z_2) & (u = u_0, v = v_0) \end{cases}.$$

Subsequently, the field at z = $z_3$ is given by $$A'_x(\xi, \zeta, z = z_3) \approx A_x\left(\frac{f_1}{f_2}\xi, \frac{f_1}{f_2}\zeta, z = z_1\right)$$

$$A'_y(\xi, \zeta, z = z_3) \approx C\exp\left[-\frac{i2\pi}{f_2\lambda}(u_0\xi + v_0\zeta)\right],$$

where C is a constant determined by the field strength $A_x$ ($u_0$, $v_0$, z=$z_2$), the polarization rotation angle α, and the polarization rotation area. In particular, when we choose ($u_0$=0, $v_0$=0), the y-polarized light amplitude is a constant over the (ξ, ζ, z=$z_3$) plane $A'_y$ (ξ, ζ, z=$z_3$)≈C (the y-polarized light amplitude may have a phase value if not a point source generating a spherical wave).

A polarization analyzer inserted into the optical path between the polarization rotator and the final image plane effectively interferes the two orthogonally-polarized field components, and the relative phase information is transferred into the polarization-projected intensity. For simplicity, we use short-hand notation of $Ae^{i\Phi}=A'_x(\xi, \zeta, z=z_3)$ and $Be^{i\phi}=A'_y(\xi, \zeta, z=z_3)$ in the following derivation. Note that B and $\phi$ are known, deterministic amplitude and phase profile as functions of $(\xi,\zeta)$, while A and $\phi$ are unknown, arbitrary functions of $(\xi,\zeta)$.

For example, when one inserts a half-wave plate whose fast axis is $\pi/8$ from the x-axis, the transmitted beam can be written using a Jones' matrix as follows:

$$\begin{pmatrix} E_x \\ E_y \end{pmatrix} = \begin{bmatrix} \cos\frac{\pi}{4} & \sin\frac{\pi}{4} \\ \sin\frac{\pi}{4} & -\cos\frac{\pi}{4} \end{bmatrix} \begin{pmatrix} Ae^{i\phi} \\ Be^{i\varphi} \end{pmatrix} = \frac{\sqrt{2}}{2} \begin{pmatrix} Ae^{i\phi} + Be^{i\varphi} \\ Ae^{i\phi} - Be^{i\varphi} \end{pmatrix}$$

The two orthogonally polarized field components can be separated using a polarizing beam splitter, and the intensity of each field component can be measured using detector arrays, such as cameras:

$$I_1 = |Ae^{i\phi}+Be^{i\phi}|^2 = A^2+B^2+2AB\cos(\phi-\varphi)$$

$$I_2 = |Ae^{i\phi}-Be^{i\phi}|^2 = A^2+B^2-2AB\cos(\phi-\varphi)$$

Consequently, we define the following spatial resolving quantity:

$$P = \frac{I_1 - I_2}{I_1 + I_2} = \frac{2AB\cos(\phi - \varphi)}{A^2 + B^2}.$$

In the second case, one inserts a quarter-waveplate with its fast axis aligned along the x-direction, followed by a half-waveplate whose fast axis is $\pi/8$ from the x-axis. The transmitted beam can be written as $$\begin{pmatrix} E_x \\ E_y \end{pmatrix} = \begin{bmatrix} \cos\frac{\pi}{4} & \sin\frac{\pi}{4} \\ \sin\frac{\pi}{4} & -\cos\frac{\pi}{4} \end{bmatrix}\begin{bmatrix} 1 & 0 \\ 0 & i \end{bmatrix} \begin{pmatrix} Ae^{i\phi} \\ Be^{i\varphi} \end{pmatrix} = \frac{\sqrt{2}}{2} \begin{pmatrix} Ae^{i\phi} + iBe^{i\varphi} \\ Ae^{i\phi} - iBe^{i\varphi} \end{pmatrix}$$

These two orthogonally polarized field components can be separated using a polarizing beam splitter, and the intensity of each field component can be measured using detector arrays, such as cameras:

$$I_3 = |Ae^{i\phi}+iBe^{i\phi}|^2 = A^2+B^2+2Ab\sin(\phi-\varphi)$$

$$I_4 = |Ae^{i\phi}-iBe^{i\phi}|^2 = A^2+B^2-2AB\sin(\phi-\varphi).$$

Consequently, we define the following spatial resolving quantity:

$$Q = \frac{I_3 - I_4}{I_3 + I_4} = \frac{2AB\sin(\phi - \varphi)}{A^2 + B^2}.$$

Now one can deduce the following spatially-resolving quantity:

$$\cos(\phi - \varphi) = \frac{P}{\sqrt{P^2 + Q^2}}$$

$$\sin(\phi - \varphi) = \frac{Q}{\sqrt{P^2 + Q^2}}.$$

The value of $(\phi-\varphi)$ can be determined without ambiguity within the range of $[0, 2\pi]$. Since $\varphi$ is a known function, which can be equal to zero when we choose $(u_0=0, v_0=0)$, one can obtain the phase of $\phi$ of the input field without any ambiguity (note that the above description is only one example to use polarization optics, sometimes also known as "imaging polarimetry" to retrieve the sine and cosine of the same phase profile $(\phi-\varphi)$).

According to a method example, the following steps are carried out:

1. The linearly-polarized complex optical field to be measured at the input plane is imaged through a 4-f imaging system (the input field may be conditioned as known in the art to be a linearly-polarized complex optical field).

2. At the Fourier plane of the input plane, a polarized rotator rotates the polarization of the input field of the small area by a small amount ('small' defined above).

3. The beam then passes through a polarization analyzer, which contains certain waveplates and can change the polarization of the input field.

4. The beam then passes through a polarizing beam splitter, and field components of two orthogonally polarizations are imaged onto one or more detector arrays, such as cameras.

5. The phase profile of the field is determined through the measurement of the spatially-resolving parameter $I_1$, $I_2$, $I_3$, $I_4$, which leads to P and Q, and consequently the phase profile $\phi(x, y)$.

Figure 2:
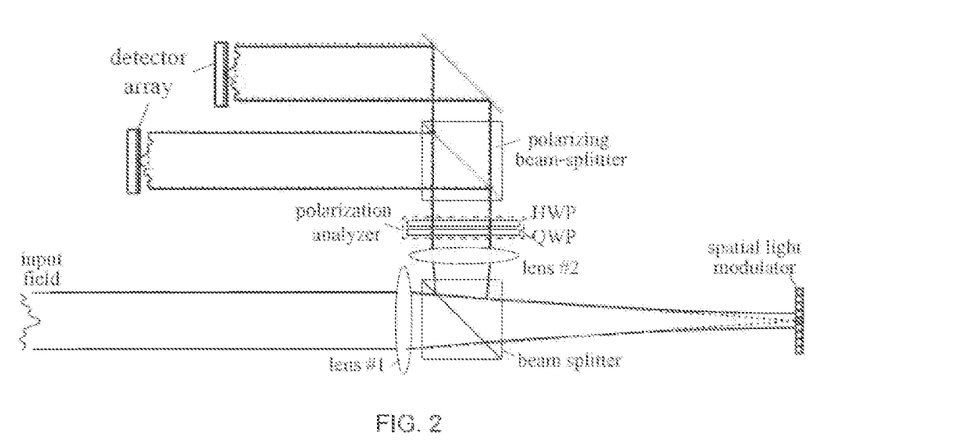
FIG. 2 is a schematic diagram of a polarization rotating interferometer wavefront sensor showing a spatial light modulator as the polarization rotator, according to an illustrative aspect of the invention.
Figure 3:
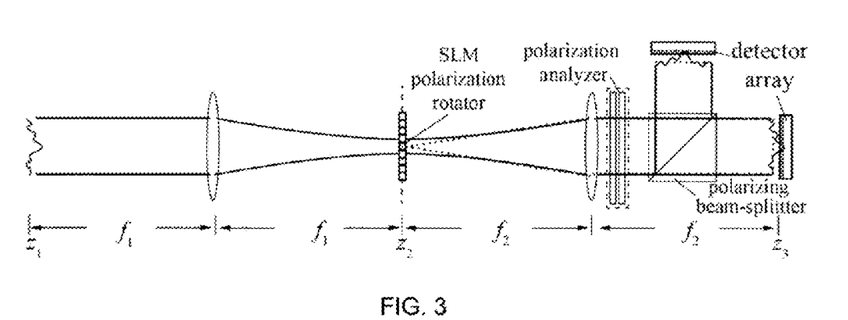
FIG. 3 schematically shows the polarization rotating interferometer wavefront sensor of FIG. 2 in an optically unfolded presentation.

FIGS. 2 and 3 illustrate an experimental set-up of a polarization rotating interferometer wavefront sensor using a spatial light modulator as the polarization rotator. A He—Ne laser at wavelength of 632.8 nm was used as the light source. The laser beam is expanded and collimated using a telescope system, and a spatial light modulator is used to create a desirable phase pattern at the input plane of the wavefront sensor. The PRINT wavefront sensor is composed of four parts. The 4-f system is composed of two lenses, each with a focal length of 50 cm. A second spatial light modulator (SLM) [Holoeye Pluto] is placed on the Fourier plane (focal plane) of the input plane, which serves as the polarization rotator. The spatial light modulator rotates the polarization of the reflected light by a controllable amount (approximately 8 degrees) while it sets a controllable phase delay. The area where the polarization is rotated is approximately 40 by 40 μm².

The reflected field from the SLM has two components with orthogonal polarizations. One has the same polarization with the input field, and is approximately equal to the input field, and the other one, here referred to as the "reference field." has the orthogonal polarization, and is a point like source at the Fourier plane (the SLM plane).

The two fields pass through two different sets of quarter-waveplate and half-waveplate, as described earlier, and then pass through a polarizing beam splitter (PBS). The transmitted fields through the two output ports of the PBS are collected with a spatially-resolving detector array (Canon 5D mark III camera). The total of four images, represented by $I_1$, $I_2$, $I_3$, $I_4$ are used to calculate P and Q, which consequently leads to the phase profile $\phi(x, y)$.

Figure 4:
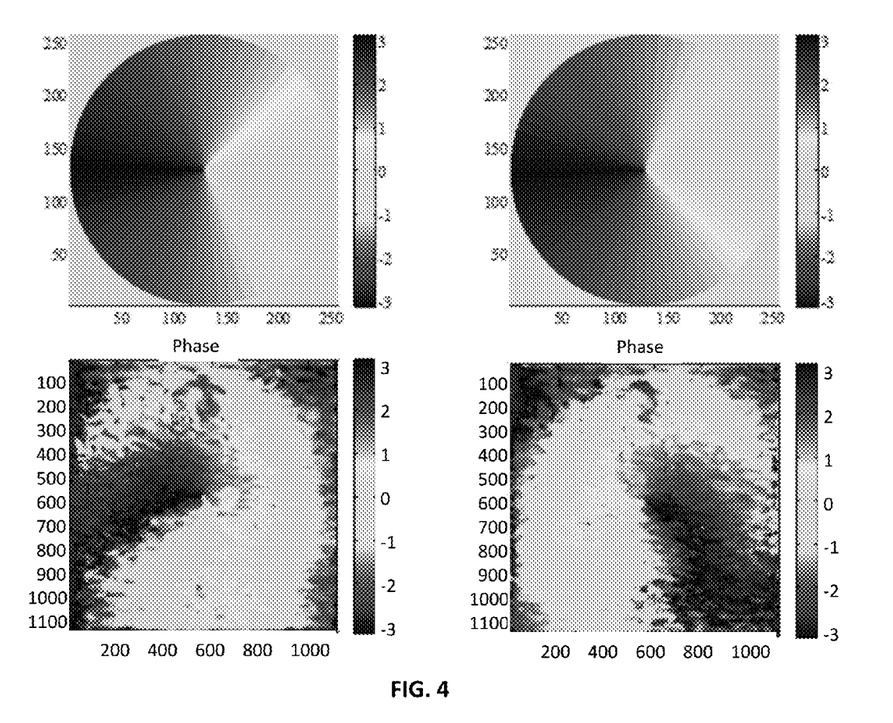
FIG. 4 represents ideal and measured wavefronts for (left) $\phi_1$ (r, θ)=θ and (right) $\phi_2$ (r, θ)=−θ. The top figures show the simulated results, and the bottom figures show the experimentally measured results.
Figure 5:
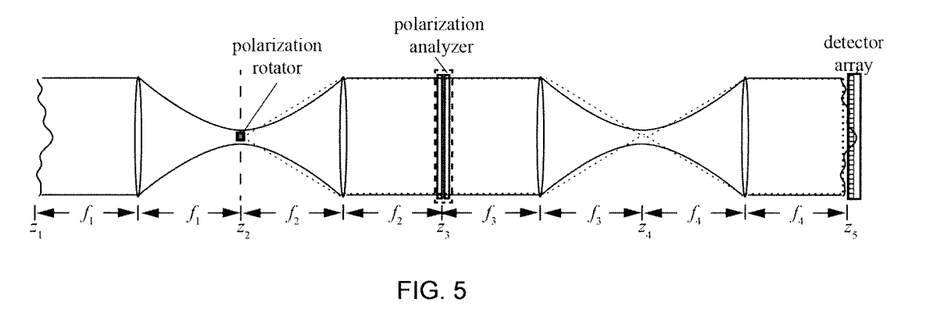
FIG. 5 is a schematic diagram of a polarization rotating interferometry wavefront sensor using two cascaded 4-f imaging systems, according to an exemplary aspect of the invention.
Figure 6:
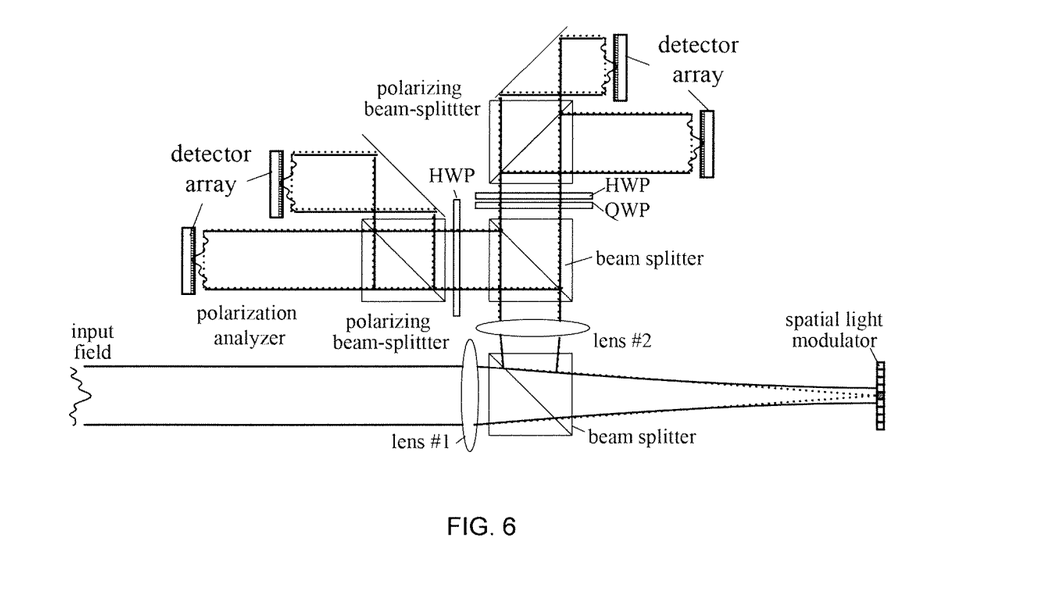
FIG. 6 is a schematic diagram of a polarization rotating interferometry wavefront sensor that measures all the images that are needed to obtain the spatial wavefront profile simultaneously, according to an exemplary embodiment of the invention.

As an example, we created two beams with uniform amplitude within a circular aperture, and with the phase profile $\phi_1(r, \theta)=\theta$ and $\phi_2(r, \theta)=-\theta$, where $\theta$ is the azimuthal angle in the plane-polar coordinate for the input plane, illustrated in FIG. 4.

The 4-f imaging system can have various constructions using refractive, reflective, diffractive and/or holographic optical elements. The basic requirement is that the final camera recording plane is the image plane of the input field with a constant zoom factor. Note that here the image plane requires a duplication of the complex field amplitude profile. For example, one can use two or more cascaded 4-f imaging systems to map the input plane to the camera plane. In another example, multiple mirrors can be used to fold the physical optical layout of the device.

The Polarization Rotator can be One of the Following Types:

1) Spatial light modulator, which can effectively alter the polarization state of the reflected/diffracted field as compared to the incident field.

2) birefringent crystal, e.g., as waveplates.

3) plasmonic nano-antennas made of metal, semiconductor, or other materials that can effectively re-radiate the input field in a different polarization state.

4) dielectric resonant structures, such as photonic crystal cavities, ring resonators, etc.

5) Metamaterials, which using artificial geometrical arrangement of different constituents of materials to achieve a particular dielectric property, especially a particular anisotropic dielectric property.

The input field can have arbitrary deterministic polarization states, rather than the x-polarization as used as an example in the derivation. In such case, a set of polarization optical elements, such as quarter waveplates and half waveplates can be used to convert the polarization state of the input field into the matching polarization state of the polarization rotator; i.e., the polarization rotator is capable of rotating one particular polarization state to a different polarization state.

When the input polarization state is a mixed state, i.e., an incoherent superposition of two or more polarization states, a polarization selective element can be placed in the front to pre-select a specific polarization state, and the device can measure the spatial phase profile of this specific polarization state.

The polarization rotator can be placed exactly at the Fourier plane of the input field or near but not exactly. As long as the position of the polarization rotator is known, and as long as the generated orthogonally-polarized field can have measurable intensity at the image plane, one can determine the spatially-dependent values of B and $\phi$ deterministically.

At least four images (e.g., $I_1$, $I_2$, $I_3$, $I_4$) are taken to measure the wavefront of the input field without any ambiguity. One can use switchable or interchangeable waveplates and polarizers to measure all the images in time sequence (e.g., as shown in FIG. 1), or pair by pair (e.g., as shown in FIG. 2), or all images at once using additional beam splitter(s) (e.g., as shown in Fig).

The 4-f Imaging system and polarization analyzer may also be in any geometry as is described, e.g., in Applied Optics, 45(22), pp 5453-5469 (2006), the subject matter of which is incorporated herein by reference in its entirety. The object is to measure the spatial profile of the polarization state of the beam after a reference beam is generated in the orthogonal polarization using the polarization rotator placed within the imaging system, such as in the Fourier plane of the input plane.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited. In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. An optical wavefront sensing apparatus, comprising:
   an imaging system;
   a polarization rotator disposed at a Fourier plane, or adjacent the Fourier plane at a known position, of an input field having a polarization state incident on the imaging system;
   a polarization analyzer disposed between the polarization rotator and an image plane of the system; and
   one or more spatially-resolving detectors disposed in the image plane of the input field having a constant zoom factor,
   wherein a polarized signal field and an orthogonally polarized reference field can be generated,
   further wherein one of the signal field and the reference field has a same polarization as the input field and one of the reference field and the signal field has an orthogonal polarization to that of the input field, and wherein the polarization analyzer comprises waveplates configured to interfere the signal field and reference field to create an interfered, transmitted field, and at least one polarizing beam splitter configured to separate the interfered, transmitted field into orthogonally polarized field components.

2. The apparatus of claim 1, wherein the imaging system is a one or a multiple-cascaded 4-f imaging system.

3. The apparatus of claim 1, wherein the polarization rotator is a spatial light modulator.

4. The apparatus of claim 3, wherein the polarization rotator is a birefringent material.

5. The apparatus of claim 3, wherein the polarization rotator is a plasmonic nano-antenna.

6. The apparatus of claim 3, wherein the polarization rotator is a dielectric resonant structure.

7. The apparatus of claim 3, wherein the polarization rotator is a metamaterial.

8. The apparatus of claim 3, wherein the polarization rotator is a liquid crystal device.

9. The apparatus of claim 1, wherein the polarization analyzer comprises at least three polarizers configured such that the transmitted field through the three polarizers will have three different, but known polarization states.

10. The apparatus of claim 1, further comprising an input field-conditioning spatial light modulator disposed optically upstream of an input of the imaging system.

11. The apparatus of claim 1, wherein the polarization analyzer includes two different sets of waveplates configured for creating two different interfered, transmitted fields.

12. The apparatus of claim 11, wherein a first set of waveplates in the polarization analyzer comprises a half-waveplate, and wherein a second set of waveplates in the polarization analyzer comprises a quarter-waveplate and a half-waveplate.

13. The apparatus of claim 1, wherein the polarization rotator is configured to rotate the polarization of the input field by an amount of $\pi/10$ or less over an area of the optical field at a known intermediate plane of the imaging system, wherein the area is equal to or less than the diffraction-limited spot size of the field produced by the imaging system at the known intermediate plane.

14. A wavefront sensing method, comprising the steps of:
   imaging an input field characterized by a linearly-polarized complex optical field to be measured through an optical imaging system;
   creating a reference optical field having a known amplitude and phase profile at the image plane and an orthogonal polarization to that of the input field by rotating the polarization of the input field over an area of the optical field at a known intermediate plane of the imaging system, wherein the area is equal to or less than the diffraction-limited spot size of the field produced by the imaging system at the known intermediate plane;
   transmitting the input field and the generated reference field through a polarization analyzer to interfere the orthogonally polarized input field and reference field;
   separating the interfered, orthogonally polarized input field and reference field;
   generating two pairs of images consisting of field components in two each different polarization states [($I_1$, $I_2$), ($I_3$, $I_4$)], wherein $I_1$ and $I_2$ are orthogonally polarized and $I_3$ and $I_4$ are orthogonally polarized, and further wherein any polarization state in any given pair must have equal projection intensity in the two polarization states in any of the two other pairs;
   determining a respective spatial resolving quantity for each pair of images [($I_1$, $I_2$), ($I_3$, $I_4$)]; and
   determining an unambiguous phase profile of the input field using the spatial resolving quantity.

15. The method of claim 14, comprising imaging the input field through one of a 4-f optical imaging system and a multiple-cascaded 4-f optical imaging system.

16. The method of claim 14, wherein the input field and the generated reference field are transmitted through two different sets of waveplates in the polarization analyzer to create two different interfered, transmitted fields, and wherein each interfered, transmitted field is separated by a polarizing beam splitter to create the two pairs of images consisting of field components in two each different polarization states [$(I_1, I_2)$, $(I_3, I_4)$].

17. The method of claim 16, wherein a first set of waveplates in the polarization analyzer through which the input field and the generated reference field are transmitted comprises a half-waveplate, and wherein a second set of waveplates in the polarization analyzer through which the input field and the generated reference field are transmitted comprises a quarter-waveplate and a half-waveplate.

18. The method of claim 14, wherein the polarization of the input field is rotated by an amount of $\pi/10$ or less over the area of the optical field equal to or less than the diffraction-limited spot size of the field produced by the imaging system at the known intermediate plane of the imaging system.

* * * * *

UNITED STATES PATENT AND TRADEMARK OFFICE
CERTIFICATE OF CORRECTION

PATENT NO.         : 9,500,531 B2
APPLICATION NO.    : 14/224353
DATED              : November 22, 2016
INVENTOR(S)        : Zhimin Shi et al.

Page 1 of 1

It is certified that error appears in the above-identified patent and that said Letters Patent is hereby corrected as shown below:

In the Specification

In Column 1, Lines 10-17 (approx.), under the heading "Government Sponsorship" delete the sentence:
"The research that lead to the embodiments as diclosed herein, and the invention as claimed herein, was funded by the United States Defense Advanced Research Project Adminstration under W911NF-10-1-0395. The United States Government has rights in the invention."

And replace with:
--This invention was made with government support under W911NF-10-1-0395 awarded by the U.S. Army Research Office. The government has certain rights in the invention.--

Signed and Sealed this
Thirtieth Day of April, 2019

Andrei Iancu
*Director of the United States Patent and Trademark Office*